Feb. 16, 1971 L. J. BRUNELLE ET AL 3,563,087
HYDRAULIC TESTER FOR FASTENERS
Filed June 19, 1968 2 Sheets-Sheet 1

INVENTORS.
ROBERT W. HENNING
LAWRENCE J. BRUNELLE

BY H. Samuel Kieser

ATTORNEY

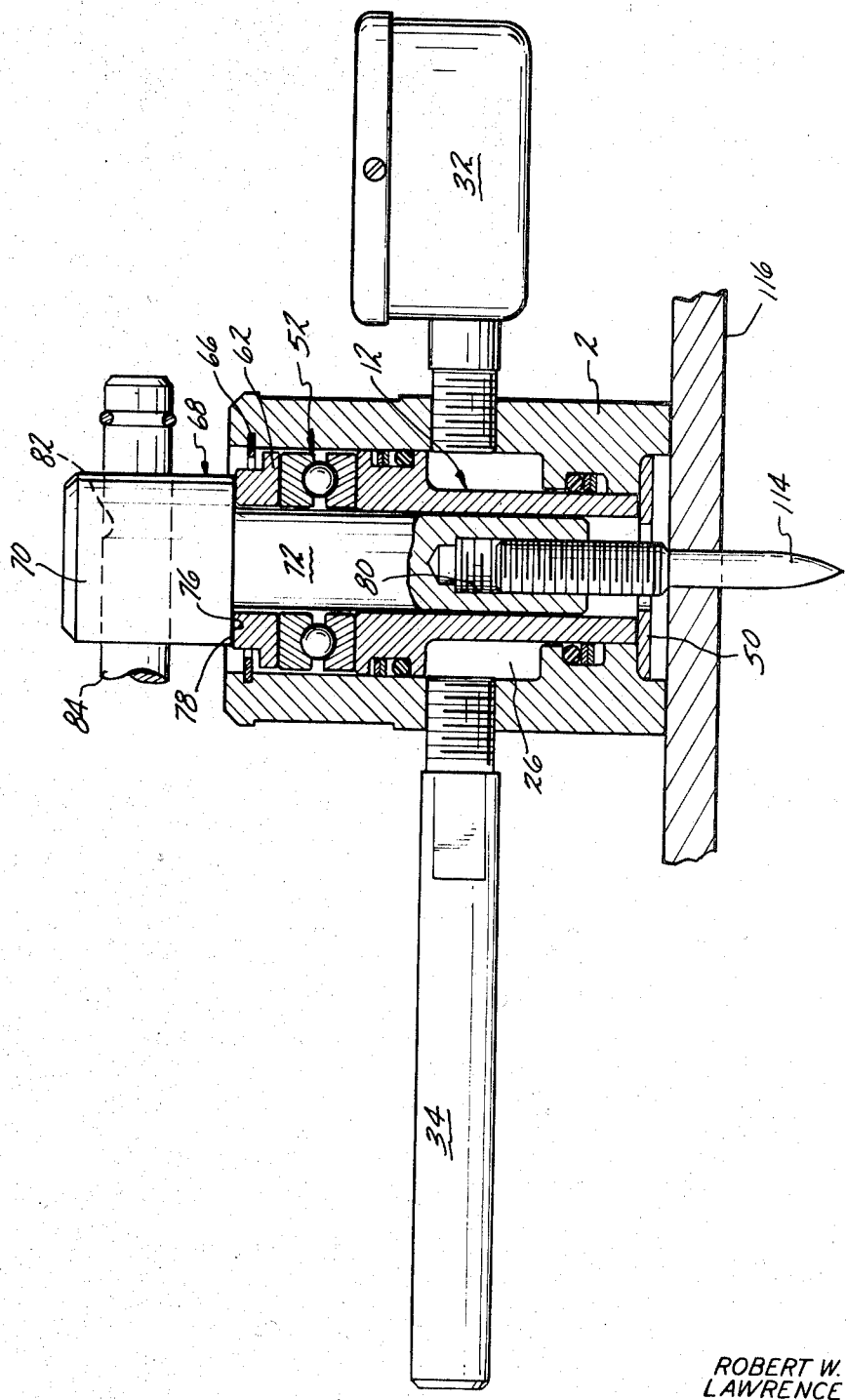

United States Patent Office 3,563,087
Patented Feb. 16, 1971

3,563,087
HYDRAULIC TESTER FOR FASTENERS
Lawrence J. Brunnelle, East Haven, and Robert W. Henning, North Haven, Conn., assignors to Olin Corporation, a corporation of Virginia
Filed June 19, 1968, Ser. No. 738,355
Int. Cl. G01n 3/08
U.S. Cl. 73—95                                8 Claims

ABSTRACT OF THE DISCLOSURE

An apparatus for testing the holding power of a fastener wherein a cavity formed between a piston and the internal surface of a housing is provided with a noncompressible fluid. Pull means, mounted in the piston, is provided at one end with means for attaching it to a fastener. Structure is also provided for transmitting the rotational movement of the pull means into an axial force acting on the piston.

---

This invention relates generally to a tester for fasteners. More particularly, this invention relates to a tester for determining if the fastener has the desired holding power.

There exists today many instances wherein it is necessary to determine if a fastener such as a stud or expandable fastener placed in a given material has the requisite holding power for its intended purpose. For, example, architects and builders, knowning the load a given fastener must sustain, must have some means for testing the fastener prior to completion of the building to be sure that the fastener has this required holding power. In addition, there are many instances wherein as part of the inspection of a given building or building system, it is advantageous to determine whether a given fastener has enough holding power to hold the member it supports. In the event that it can be determined that a fastener does not have the requisite holding power, remedial steps can be taken to prevent any hazardous results that may occur due to its failure.

In view of the above, it is an object of the present invention to provide an improved device for testing the holding power of a fastener.

It is a further object of the present invention to provide a device for testing the holding power of a fastener which is compact and easy to use.

A further object of this invention is to provide a device for testing the holding power of fasteners which is inexpensive to manufacture.

These and other objects of this invention will be more readily understood by reference to the following description of a preferred modification of the invention and to the accompanying drawings in which:

FIG. 3 is a view similar to FIG. 2, but showing the components of the device positioned during the testing operation.

Figure 2:
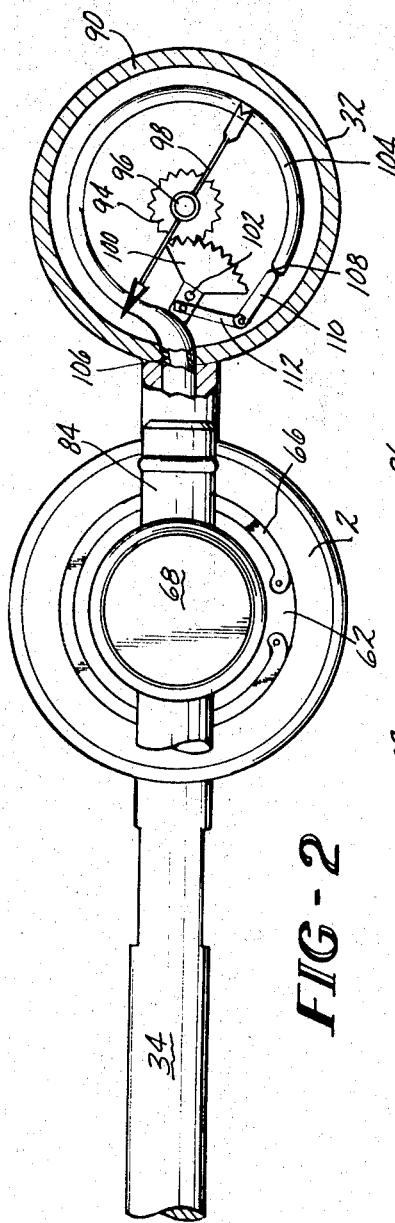
FIG. 2 is a top plan view of the device shown in FIG. 1 with a portion of the gauge broken away to schematically illustrate its principle of operation.

Referring to the drawings, the preferred embodiment of the tester of the present invention includes a generally cylindrical housing 2 having a counterbore 4 extending inwardly from its upper end and terminating in a shoulder 6. The lower portion of the housing 2 includes a bore 8 which is reduced with respect to the counterbore 4 and an enlarged counterbore 10 in the lower end.

A piston member 12 is mounted within the housing 2 and includes a head portion 14 having its outer edge 16 in engagement with the wall of the counterbore 4 in the housing 2. Extending downwardly from the head portion 14 is a cylindrical portion 18 having a cylindrical outer surface 20 of such diameter that a portion thereof engages the wall of the reduced bore 8. By virtue of this construction, a shoulder 22 is formed at the junction of the head portion 14 and the reduced cylindrical portion 18.

An internally threaded inlet port 24 is provided in the wall of the housing 2. This inlet port 24 provides a means for filling the cavity 26 defined by a portion of the wall of the counterbore 4 of the housing 2, a portion of the outer surface 20 of the cylindrical portion 18 of the piston 12, the shoulder 22 on the piston 12 and the shoulder 6 of the bottom of the counterbore 4. An internally threaded outlet port 28 is provided in the housing 2, preferably in diametric opposition to the inlet port 24, to which the threaded male connection 30 of an indicator gauge 32 is connected. The cavity 26 and the appropriate portions of gauge 32 can be filled with a suitable amount of oil or other substantially noncompressible fluid by forcing the oil or fluid through the inlet port 24. The inlet port 24 is then closed by means of a handle 34 which includes a threaded male portion 36 connected to the inlet port 24.

To keep the oil within the cavity 26 from leaking out of the housing 2, sealing means are mounted in a circumferentially extending groove 38 in the outer surface 16 of the head portion 14 of the piston 12. The sealing means includes a resilient O-ring 40 positioned in the groove 38 at a point closest to the cavity 26 and two backup washers 42 positioned against the O-ring 40. Also, sealing means including an O-ring 44 and two backup rings 46 are positioned in a suitable groove 48 within the wall of the reduced bore 8 of the housing 2. Both of the sealing means prevent leakage of the oil out of the cavity 26 between the external surface of the piston 12 and the internal surface of the housing 2.

Figure 1:
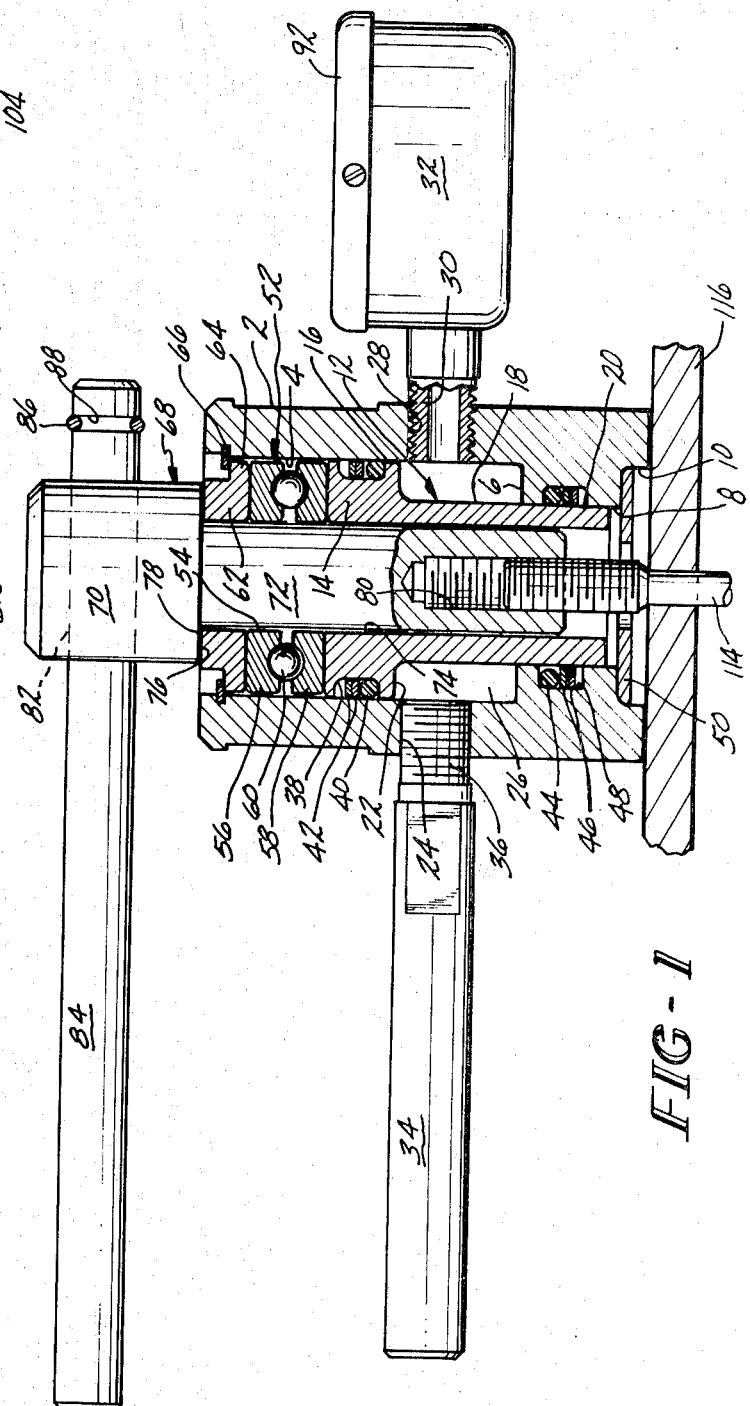
FIG. 1 is a side view, partially in section, of a tester constructed in accordance with the present invention.

A gasket 50 is frictionally mounted within the counterbore 10 in the bottom of the housing 2 to prevent the piston 12 from moving too far downwardly to a point where the head portion 14 of the piston member 12 would cover the inlet port 24 and thus prevent the entry of oil into the cavity 26 prior to the handle 34 being attached to the housing 2. A thrust bearing 52 is mounted on top of the piston member 12 and includes a central aperture 54. The thrust bearing 52 may be of any conventional type. As shown in FIGS. 1 and 3, it includes upper and lower races 56 and 58, respectively, separated by a plurality of ball bearings 60. A collar 62 is positioned above the upper race 56 and includes a circumferentially extending flange 64. A snap ring 66 is mounted in a suitable groove in the wall of the counterbore 4 of the housing 2 and overlaps the flange 64 of the collar 62 to act as stop means to limit movement of the collar 62, bearing 52 and piston 12 in an upward direction as shown in FIG. 1.

A pull screw 68 is provided which includes an enlarged head portion 70 and an elongated rod portion 72. The pull screw is adapted to be removably mounted within the housing 2 with the rod portion 72 extending through the collar 62, aperture 54 in the bearing 52, and a bore 74 in the piston 12. The bottom surface 76 of the head portion 70 is adapted to abut against the upper surface 78 of the collar 62.

The bottom end of the rod portion 72 is provided with an axially extending bore 80 which is internally threaded. It is to be understood that a plurality of interchangeable pull screws 68 are to be provided with the tester, the thread size and diameter of the bore 80 of each pull screw being different so as to accommodate fasteners having different threaded head sizes.

The head portion 70 of the pull screw 68 is provided with a bore 82 extending perpendicular to the axis of the pull screw 68. A torque bar 84 is adapted to be removably inserted through the bore 82 and includes a stop ring 86 mounted in a suitable groove 88 therein to prevent withdrawal of the torque bar 84 from the head portion 70 in one direction.

The indicator gauge 32 may be of any conventional type having a suitable indicator which is operable upon the movement of the piston 12 in a downwardly direction to indicate the amount of pressure being exerted by the piston on the oil. If the gauge is calibrated in p.s.i., and the effective area of the piston acting on the oil is one square inch, the p.s.i. reading can be read simply as pounds to give the operator an indication of the holding power of a fastener in pounds. By way of an example, a Bourdon-tube gauge, which is commercially available, may be used. In its simplest form the gauge includes a housing 90 and a cover 92 provided with suitable indicia. As shown in FIG. 2, a pinion 94, mounted about a central pivot pin 96 is positioned within the housing 90. A pointer 98 is attached to the pinion for movement therewith. A sector gear 100 is mounted on a suitable pivot pin 102 and is operably connected to the pinion gear 94. A Bourdon-tube 104, having one end 106 in communication with the inlet port of the gauge 32 and its other end 108 closed, extends circumferentially about the housing 90 and is spaced from its interior wall. The closed end 108 is attached by means of extension 110 to a linkage 112 which has one end pivotally connected to the sector gear 100 and its other end pivotally connected to the extension 110. With this construction, when the oil or other non-compressible fluid is forced into the tube, the tube tends to straighten causing the sector gear 100 to pivot counterclockwise as viewed in FIG. 2 about its pivot pin 102, which in turn rotates the pinion 94 and pointer 98 about pivot pin 96 in a clockwise direction.

To operate the tester, the housing 2 is placed over the fastener 114 to be tested until the bottom abuts the workpiece 116. The proper pull screw 68 is then selected in accordance with the thread size of the fastener to be tested. The pull screw 68 is inserted through the collar 62, aperture 54 of the bearing 52, and bore 74 in the piston 12 and manually threaded onto the head 118 of the fastener 114 until the bottom surface 76 of the head 70 of the piston 12 is in tight abutment with the upper surface 78 of the collar 62. In the event that the length of he threaded head portion 118 of the fastener 114 is greater than the depth of the threaded bore 80 in the pull screw 68, spacers (not shown) can be placed between the bottom of the housing 2 and the workpiece 116. The torque bar 84 may then be inserted through the bore in the head 70 of the pull screw 68 and used to rotate the pull screw 68 with respect to the housing 2 in a proper direction to tend to thread the pull screw 68 onto the fastener 114. In so doing, the pull screw 68 will tend to move downwardly as shown in FIG. 3, forcing the piston 12 in a downwardly direction and reducing the volume of cavity 26 thereby increasing the pressure on the oil and actuating the indicator of the gauge 32.

If, at a given point, the fastener tends to pull out, there will be no additional movement between the piston and the housing whereby the pressure on the oil in the cavity 26 will diminish and the indicator on the gauge will tend to fall. Thus, the operator is able to tell not only if the fastener has a holding power sufficient to support a given load, but also, if the limit of the gauge is high enough, the operator can also tell the ultimate holding power of the fastener.

While reference has been made above to a specific embodiment of this invention, various modifications and alterations will readily suggest themselves to those skilled in the art. Accordingly, the scope of this invention should be ascertained by reference to the following claims.

We claim:

1. An apparatus for testing the holding power of a fastener which has been driven into material and having a threaded portion extending above the surface of said material, said apparatus comprising a housing having a through bore defined by first wall means, second reduced wall means, and a shoulder between said first and second wall means; said housing further having surface means for engagement with the surface of the material; piston means mounted in said housing and including a head portion and a reduced extension portion; said head portion having sliding contact with said first wall means and said extension portion having a portion in sliding engagement with said second wall means; a cavity defined by said shoulder, the forward surface of said head portion, said first wall means, and the outer surface of said extension portion; a non-compressible fluid filling said cavity; outlet means in said housing communicating with said cavity for connection to the inlet of gauge means; a bore through said piston means; pull means having a portion telescopically received in said piston bore; one end of said pull means being internally threaded for attachment to the threaded portion of said fastener; means for enabling rotational movement to be imparted to said pull means so that when said housing is placed against the surface of the material the pull means will be threaded onto the fastener; and means operably connecting the pull means and piston means so that as the pull means is rotated and threaded upon the fastener, the piston means is moved in a direction to reduce the volume of said cavity, the pressure in said cavity, detected by said gauge, providing an indication of the holding power of said fastener.

2. The apparatus of claim 1 wherein said housing includes an inlet port and further including a handle attached to said housing in closing relationship with said inlet port and extending outwardly therefrom.

3. The apparatus of claim 1 wherein said pull means has a head portion at its other end, and further including a bar having stop means adjacent one end thereof, a bore extending transversely through said head portion, said bar removeably extending through said bore with said one end thereof being positioned closest to said head portion.

4. The apparatus of claim 3 further including a handle attached to said housing and extending therefrom.

5. The apparatus of claim 1 including a sleeve member in contact with said head portion of said pull means, and a thrust bearing interposed between said sleeve member and said piston means.

6. The apparatus of claim 5 wherein said sleeve member includes a circumferentially extending flange, a snap ring mounted in said bore of said housing in a position to be engaged by said sleeve member when said sleeve member moves toward the end of said housing closest to said head means of said pull means, and a retaining ring mounted in said housing in a position to be engaged by the end of said extension portion of said piston means when said piston means moves toward the other end of said housing.

7. The apparatus of claim 1 including sealing means between said head portion of said piston means and said bore of said housing and sealing means between said portion of said extension portion and said second reduced wall means.

8. The apparatus of claim 7 wherein each of said sealing means is mounted in a respective circumferential groove in said piston means.

References Cited

UNITED STATES PATENTS

| | | | |
|---|---|---|---|
| 1,316,281 | 9/1919 | Dalton | 73—140 |
| 2,681,565 | 6/1954 | Kelk | 73—140 |
| 2,835,128 | 5/1958 | Herrstrum | 73—141 |
| 2,978,898 | 4/1961 | Skidmore | 73—1 |
| 3,129,584 | 4/1964 | Canning | 73—141 |

RICHARD C. QUEISSER, Primary Examiner

J. WHALEN, Assistant Examiner

U.S. Cl. X.R.

73—88, 141; 254—18